(12) United States Patent
Parkerson (10) Patent No.: US 8,917,494 B2
(45) Date of Patent: Dec. 23, 2014

(54) DUAL ACTION SHUTTER FOR DRAWOUT CIRCUIT BREAKER

(71) Applicant: Siemens Industry, Inc., Alpharetta, GA (US)

(72) Inventor: Jason Parkerson, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 307 days.

(21) Appl. No.: 13/645,893

(22) Filed: Oct. 5, 2012

(65) Prior Publication Data

US 2014/0098469 A1    Apr. 10, 2014

(51) Int. Cl.
*H02B 1/14* (2006.01)
*H02B 11/167* (2006.01)

(52) U.S. Cl.
CPC .................................... *H02B 11/167* (2013.01)
USPC ........................................ 361/617; 200/50.22

(58) Field of Classification Search
CPC ............................. H02B 11/167; H01H 9/2282
USPC ..................... 361/608, 617; 200/50.21, 50.22
See application file for complete search history.

(56) References Cited

U.S. PATENT DOCUMENTS

| | | | | | |
|---|---|---|---|---|---|
| 3,920,939 | A | * | 11/1975 | Ciboldi et al. | ............. 200/50.22 |
| 4,486,815 | A | * | 12/1984 | Takahashi | ...................... 361/617 |
| 5,343,355 | A | * | 8/1994 | Ishikawa | ........................ 361/617 |
| 5,486,978 | A | * | 1/1996 | Fishovitz | ....................... 361/617 |
| 5,550,707 | A | * | 8/1996 | Iversen | .......................... 361/617 |
| 7,440,259 | B1 | * | 10/2008 | Deylitz et al. | ................. 361/617 |
| 7,869,194 | B2 | * | 1/2011 | Deylitz et al. | ................. 361/647 |
| 7,903,393 | B2 | | 3/2011 | Buxton | |
| 2004/0129545 | A1 | * | 7/2004 | Deylitz et al. | ................. 200/400 |
| 2009/0128999 | A1 | * | 5/2009 | Deylitz et al. | ................. 361/617 |

* cited by examiner

*Primary Examiner* — Gregory Thompson (57) ABSTRACT

A shutter device for a drawout circuit breaker. The arrangement includes first and second moveable plungers for contacting the circuit breaker. The arrangement also includes a first slider element attached to a moveable first mask. A first link arm is rotatably attached to the first plunger and the first slider element. The arrangement also includes a second slider element attached to a moveable second mask. A second link arm is rotatably attached to the second plunger and the second slider element. Movement of the first and second plungers in a first direction causes movement of the first and second slider elements and the first and second masks in a second direction transverse to the first direction relative to a back plate to form mask passageways. The arrangement also includes a plurality of mounting elements that enable movement of the back plate in the first direction.

19 Claims, 10 Drawing Sheets

DUAL ACTION SHUTTER FOR DRAWOUT CIRCUIT BREAKER

FIELD OF THE INVENTION

This invention relates to electrical equipment having a drawout circuit breaker, and more particularly, to a shutter device having plungers which are moveable in a first direction and masks which are moveable in a second direction relative to a back plate wherein the back plate is also moveable in the first direction after movement of the plungers is stopped.

BACKGROUND OF THE INVENTION

Electrical equipment such as switchboards, switchgear and others include a plurality of drawout circuit breakers having three pole, four pole, AC, DC configurations and others. The circuit breakers are removeably inserted into associated moveable frames or cradles to establish electrical contact with bus bars, load and line stabs, or similar electrical terminals. When a circuit breaker is removed however, the terminals typically remain energized. This poses a safety hazard since an operator may be injured if the terminals are accidentally touched while servicing the equipment or installing other components near the terminals. Therefore, it is desirable to cover the exposed terminals when a circuit breaker is removed so that the terminals are inaccessible to hinder the possibility of inadvertent contact with the terminals.

A shutter mechanism having moveable shutters is frequently used to cover or expose the terminals. Upon removal of the circuit breaker from a frame, the shutter mechanism causes the shutters to move and close apertures formed in a back wall of the frame so that the bus bar terminals, for example, are covered. Upon insertion of the circuit breaker into the frame, the shutter mechanism causes the shutters to move and expose the apertures to enable contact between the circuit breaker terminals and bus bar terminals. However, conventional shutter mechanisms are difficult to use, expensive to manufacture and are prone to damage.

SUMMARY OF THE INVENTION

A shutter device for a drawout circuit breaker is disclosed. The shutter device includes first and second moveable plungers for contacting the circuit breaker. In addition, the shutter device includes a first slider element attached to a first mask having a plurality of first apertures wherein the first mask is moveable relative to a back plate. A first link arm is rotatably attached to the first plunger and the first slider element. The shutter device also includes a second slider element attached to a second mask having a plurality of second apertures wherein the second mask is moveable relative to the back plate. A second link arm is rotatably attached to the second plunger and the second slider element wherein movement of the first and second plungers in a first direction causes movement of the first and second slider elements and the first and second masks in a second direction transverse to the first direction to form mask passageways. Further, the shutter device includes a plurality of spring mount elements for supporting the back plate, wherein the spring mount elements enable movement of the back plate in the first direction.

DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-7.

Figure 1:
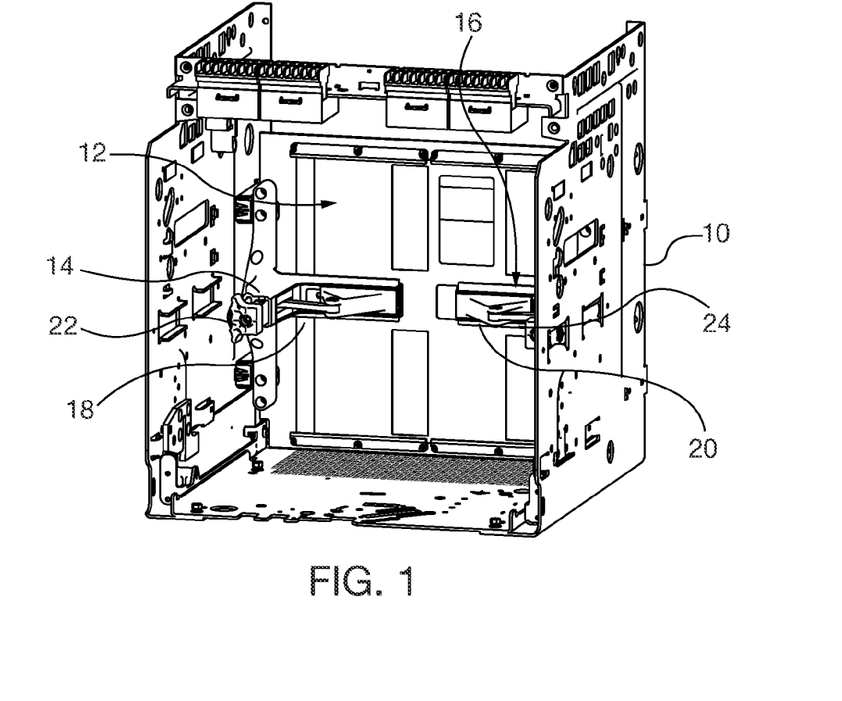
FIG. 1 is a perspective view of a drawout circuit breaker cradle including a shutter device in accordance with the present invention.

Referring to FIG. 1, a drawout circuit breaker cradle 10 is shown. The cradle 10 includes a shutter device 12 having first 14 and second 16 tower assemblies (see FIG. 3A) and associated first 18 and second 20 slider assemblies for moving first 40 and second 42 masks (see FIGS. 4 and 5) relative to a back plate 26 (FIG. 2) as will be described. The first 14 and second 16 tower assemblies include first 22 and second 24 caps, respectively, to provide two contact points for a circuit breaker that is inserted into the cradle 10.

Figure 2:
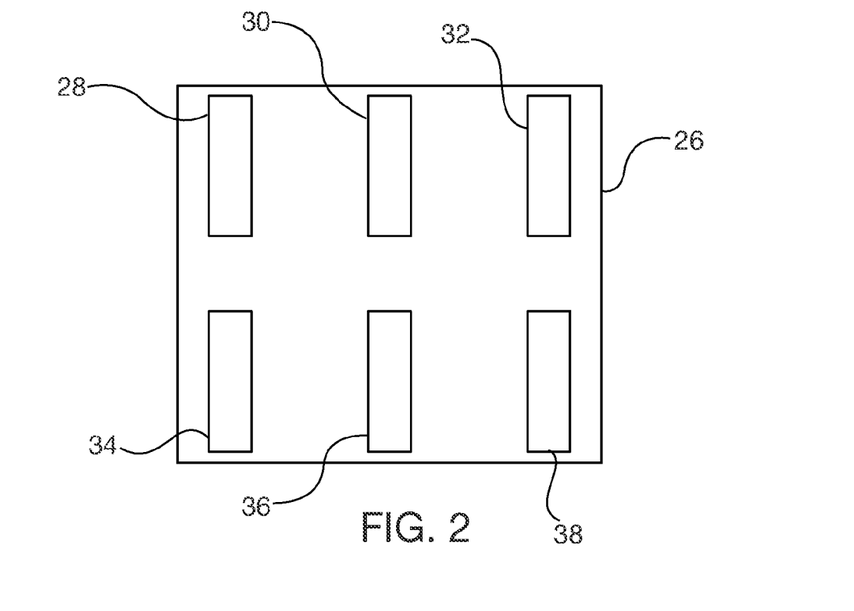
FIG. 2 is a view of a back plate used in conjunction with the shutter device.

Referring to FIG. 2, view of the back plate 26 used in conjunction with the shutter device 12 is shown. The back plate 26 includes a plurality of back plate apertures each aligned with a corresponding electrical terminal, such as a bus bar terminal, to thus enable access to the corresponding terminal. By way of example, the back plate 26 may include first 28, second 30 and third 32 back plate apertures along an upper row and fourth 34, fifth 36 and sixth 38 back plate apertures along a bottom row each of which enable access to a bus bar terminal located behind a plane of the back plate 26. Alternate embodiments of the back plate 26 may include eight, twelve or sixteen back plate apertures. The number of back plate apertures corresponds to the number of mask passageways that are formed when one or more masks are moved to an open position as will be described in relation to FIGS. 4 and 5.

Figure 3A:
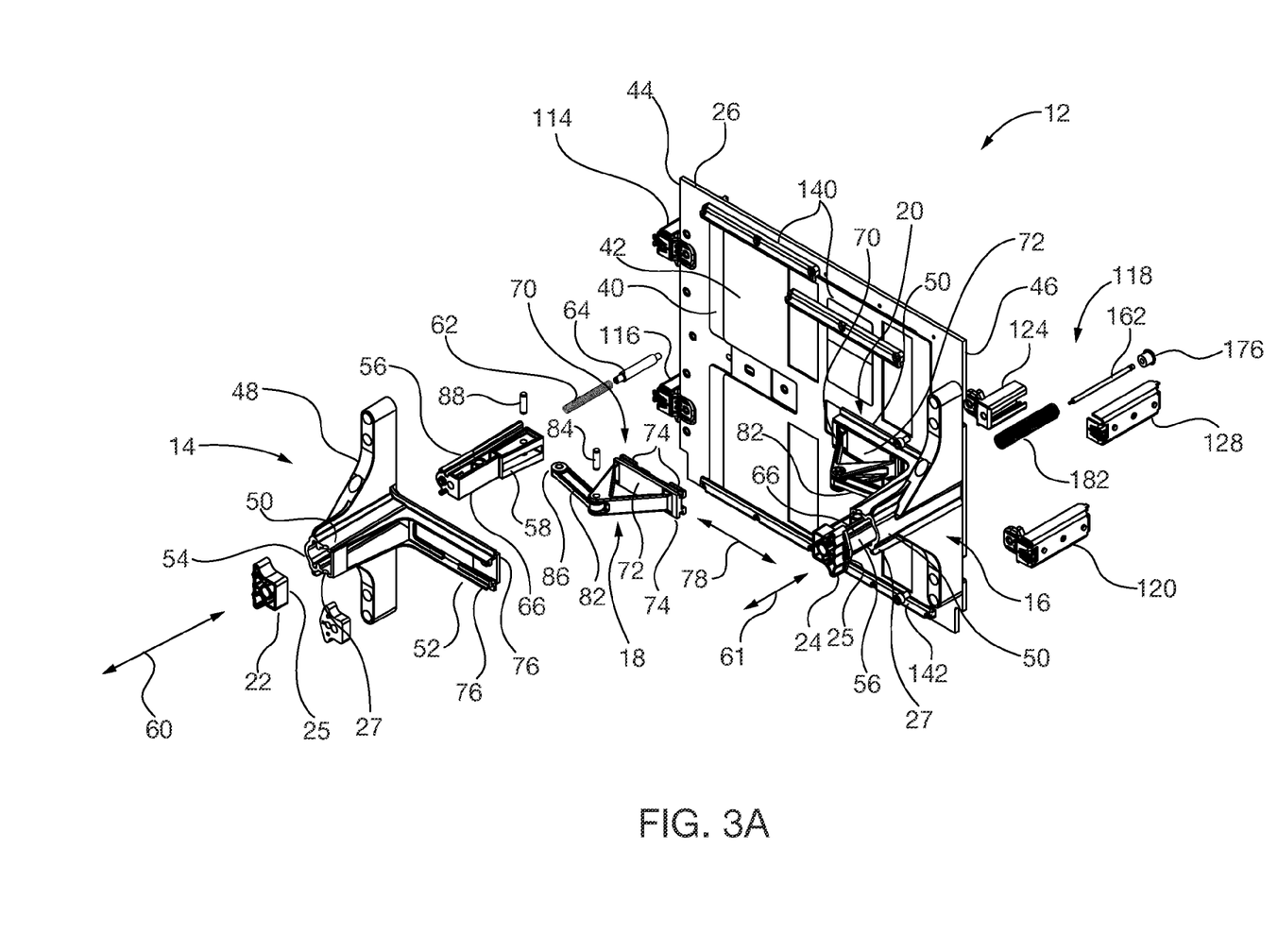
FIG. 3A is a view of the shutter device wherein portions are shown in an exploded view.
Figure 3B:
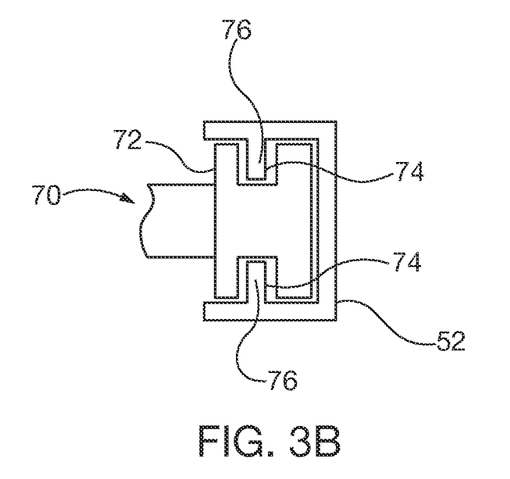
FIG. 3B is an end view of a base portion and a slide portion depicted in FIG. 3A.

Referring to FIG. 3A, a view of the shutter device 12 is shown. The shutter device 12 includes first 40 and second 42 masks each having apertures as will be described. The first 14 and second 16 tower assemblies are affixed along first 44 and second 46 side edges, respectively, of the back plate 26. The first tower assembly 14 is depicted as an exploded view. It is understood that the following description of the first tower assembly 14 is also applicable to the second tower assembly 16. The first tower assembly 14 includes a tower 48 having a guide portion 50 and a secondary guide portion 52 to form a substantially inverted L-shaped configuration. The guide portion 50 includes a channel 54 for receiving a plunger 56 having a pair of side flanges 59. The plunger 56 is moveable in the channel 54 along a first axis 60 oriented substantially perpendicular to a plane of the back plate 26. Similarly, the plunger 56 in the second tower assembly 16 is moveable along a second axis 61 which is also oriented substantially perpendicular to the back plate 26. A plunger spring 62 is located between the plunger 56 and a plunger guide pin 64 affixed to the back plate 26. The plunger spring 62 may be a compression spring configured to push against a portion of the plunger 56 such that a front end 66 of the plunger 56 extends out of the channel 54. The plunger spring 62 is substantially encapsulated by the plunger 56. The front end 66 of the plunger 56 includes the first cap 22 which is shaped to mate with a portion of a circuit breaker and serves as a point of contact with the circuit breaker. Therefore, first cap 22 from the first tower assembly 14 in conjunction with the second cap 24 from the second tower assembly 16 provide two contact points for mating with the circuit breaker. In accordance with the invention, first 22 and second 24 caps are interchangeable with other caps in order to accommodate circuit breakers having different configurations.

In addition, a rear surface 25 of the first 22 and second 24 caps is adapted to mate with a contact edge surface 27 of the guide portion 50 of the first 14 and second 16 tower assemblies. The rear surfaces 25 of the first 22 and second 24 caps each abut against an associated contact edge surface 27 when an associated plunger 56 is moved toward the back plate 26 as will be described.

The first tower assembly 14 further includes a slider element 70 having spaced apart arms to form a substantially V-shaped configuration. The arms are connected to a base portion 72 that is attached to the first mask 40. The base portion 72 includes groove portions 74 (see end view in FIG. 3B) which receives flanges 76 formed in the secondary guide portion 52 to thus enable movement of the slider element 70 and the first mask 40 relative to the secondary guide portion 52 along a third axis 78 substantially transverse to the first axis 60. Referring back to FIG. 3A, a first end 80 of a link arm 82 is rotatably connected to the slider element 70 by a first slider pin 84 to enable rotational movement of the link arm 82 relative to the slider element 70. A second end 86 of the link arm 82 opposite the first end 80 extends through a side slot 58 formed in plunger 56 and is rotatably connected therein by a second slider pin 88 to enable rotational movement of the link arm 82 relative to the plunger 56. The secondary guide portion 52 is attached to the back plate 26. In use, movement of the plunger 56 along the first axis 60 causes rotation of the link arm 82 relative to the plunger 56 and a corresponding rotation of the link arm 82 relative to the slider element 70, thus causing translational movement of the slider element 70 and the first mask 40 along the third axis 78 and thus in a direction transverse to the movement of the plunger 56 of the first tower assembly 14.

The base portion 72 of slider element 70 of the second tower assembly 16 is attached to the second mask 42. Movement of the plunger 56 in the second tower assembly 16 along the second axis 61 causes rotation of the link arm 82 relative to the plunger 56 and a corresponding rotation of the link arm 82 relative to the slider element 70 of the second tower assembly 16, thus causing translational movement of the slider element 70 and the second mask 42 along the third axis 78 and in a direction transverse to the movement of the plunger 56 of the second tower assembly 16. When the plungers 56 of the first 14 and second 16 tower assemblies are actuated concurrently in a rearward direction along the first 60 and second 61 axes towards the back plate 26, the respective first 40 and second 42 mask elements move in respective opposite directions along third axis 78 as will be described in relation to FIGS. 6A-6C.

Figure 3C:
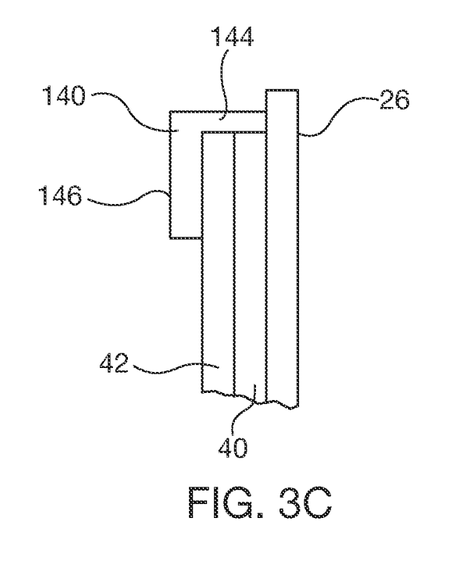
FIG. 3C is view of an exemplary upper guide rail for guiding first and second masks.

The back plate 26 further includes upper 140 and lower 142 guide rails. Referring to FIG. 3C, an exemplary upper guide rail 140 is shown. The upper guide rail 140 includes a horizontal portion 144 and a downwardly extending lip portion 146 located adjacent the second mask 42 to form a substantially L-shaped groove. Similarly, the lower guide rails 142 each include a horizontal portion 144 but with an upwardly extending lip portion. The horizontal portions 144 and lip portions 146 of the upper guide rail 140 and that of the lower guide rails 142 are configured to enable the first 40 and second 42 masks to slide relative to each other and the back plate 26 along the third axis 78 substantially transverse to the first 60 and second 61 axes.

Figure 4:
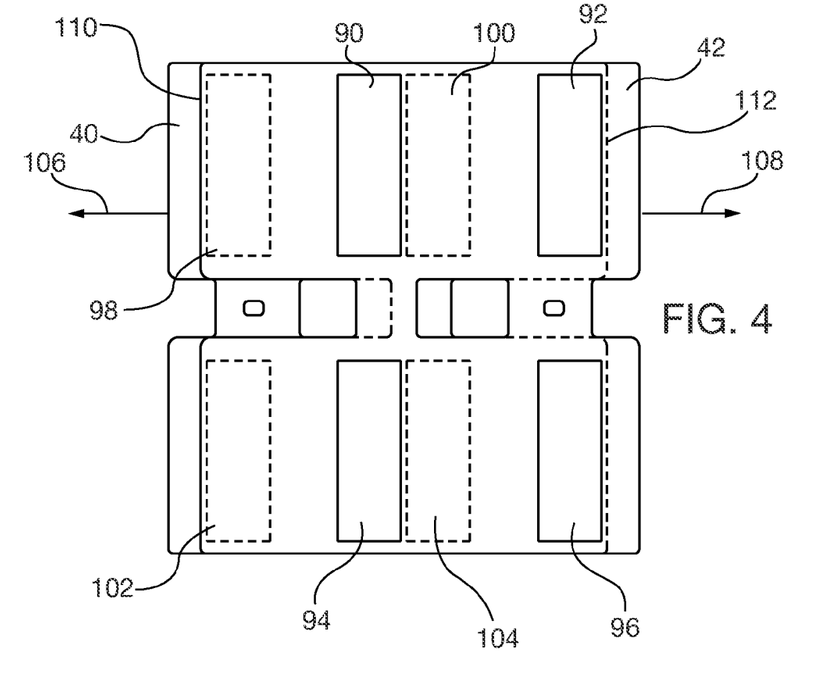
FIG. 4 depicts the first and second masks in a closed position.

Referring to FIG. 4, the first 40 and second 42 masks are shown in a closed position. The first 40 and second 42 masks are each configured as planar elements and are moveable relative to each other. In FIG. 4, the first mask 40 is located behind the second mask 42. The second mask 42 includes first 90 and second 92 mask apertures located in an upper row and third 94 and fourth 96 mask apertures located in a lower row. Similarly, the first mask 40 includes fifth 98 and sixth 100 mask apertures located in an upper row and seventh 102 and eighth 104 mask apertures located in a lower row (shown as dashed lines). In alternate embodiments, the first 40 and second 42 masks may have additional or fewer apertures. In the closed position, the first-fourth 90,92,94,96 mask apertures are located in an offset position relative to the fifth-eighth 98,100,102,104 mask apertures. Therefore, the first-fourth 90,92,94,96 mask apertures are covered by portions of the first mask 40 and the fifth-eighth 98,100,102,104 mask apertures are covered by portions of the second mask 42 to thus close off the first-eighth 98,100,102,104 mask apertures. In order to uncover the first-eighth 90,92,94,96,98,100,102,104 mask apertures the first mask 40 is moved in a first direction 106 along the third axis 78 and the second mask 42 is moved in a second direction 108 opposite the first direction 106 to place the first 40 and second 42 masks in an open position.

Figure 5:
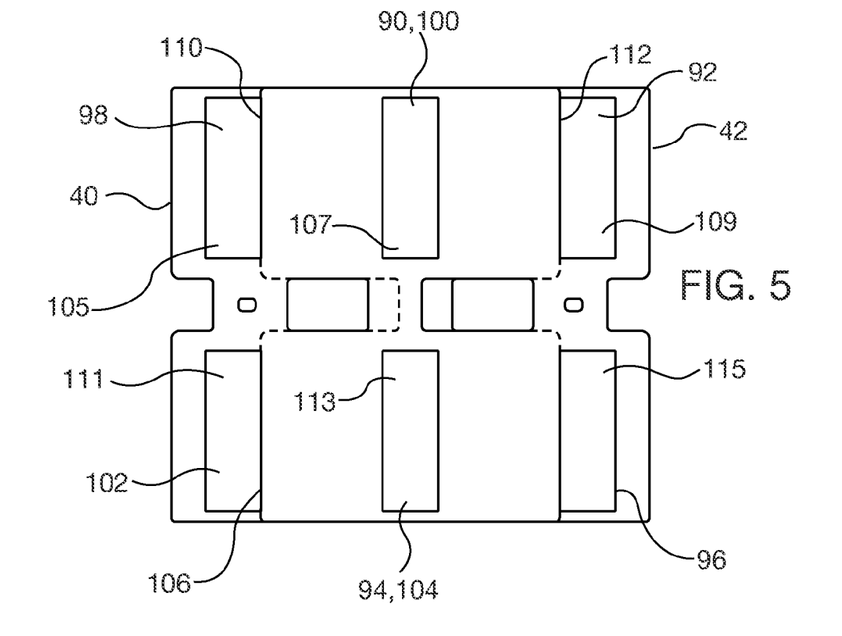
FIG. 5 depicts the first and second masks in an open position.

Referring to FIG. 5, the first 40 and second 42 masks are shown in the open position. In the open position, the first 90 and sixth 100 apertures are aligned with each other to form a second mask passageway 107 and the third 94 and eighth 104 apertures are aligned with each other to form a fifth mask passageway 113. In addition, the fifth 98 and seventh 102 apertures are located beyond a first edge 110 of the second mask 42 thus uncovering the apertures to form first 105 and fourth 111 mask passageways, respectively. Similarly, the second 92 and fourth 96 apertures are located beyond a first edge 112 of the first mask 40 thus uncovering the apertures to form third 109 and sixth 116 mask passageways, respectively. Thus, the first-eighth 90,92,94,96,98,100,102,104 mask apertures form first-sixth 105,107,109,111,113,115 mask passageways which correspond to the position of the first-sixth 28,30,32,34,36,38 back plate apertures (See FIG. 2) to enable access to each bus bar terminal.

Figure 3D:
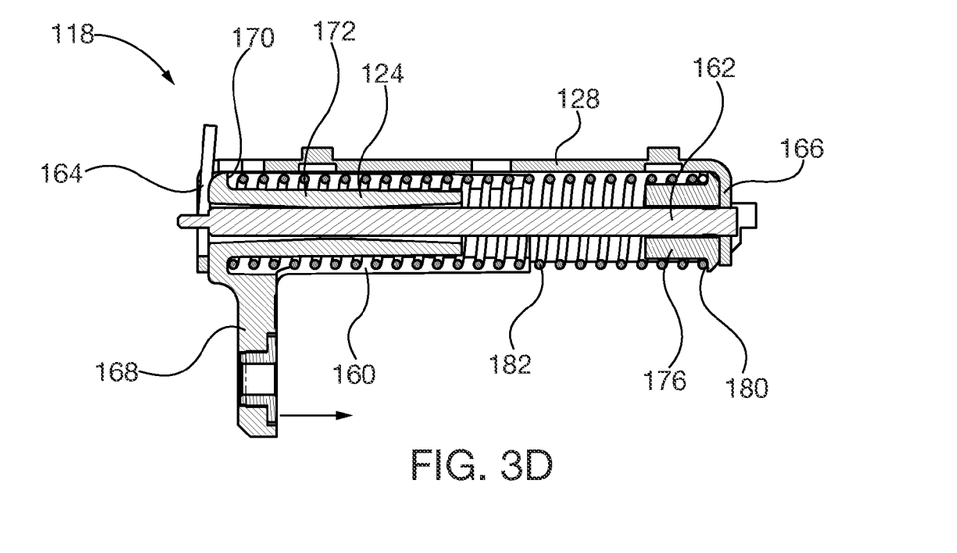
FIGS. 3D-3E depict views of a spring mount assembly for holding the back plate.
Figure 3E:
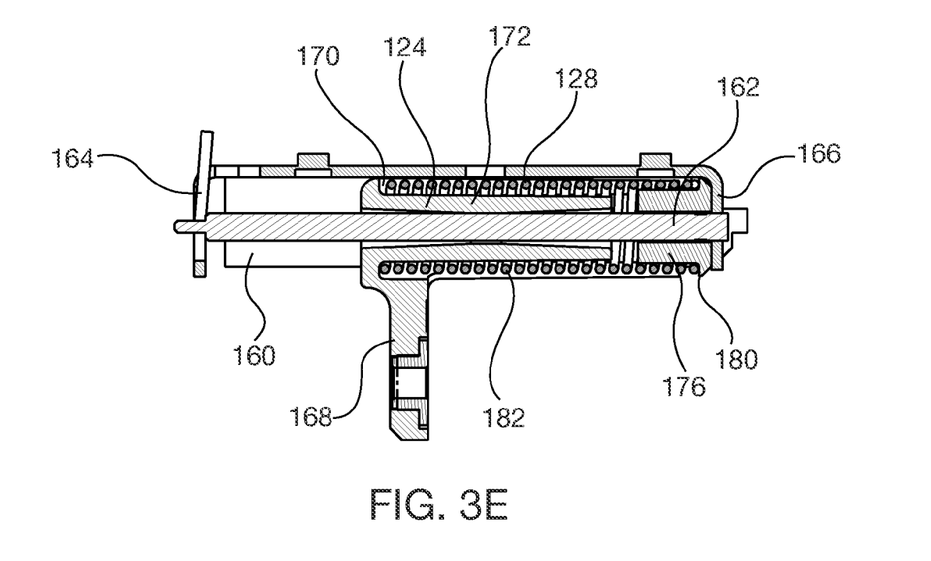

Referring back to FIG. 3A, the shutter device 12 further includes first 114, second 116, third 118 and fourth 120 spring mount assemblies for positioning the back plate 26 in front and rear positions. Referring to FIGS. 3D-3E, each spring mount assembly 114,116,118,120 includes a stationary housing 128 and a moveable element 124. The stationary housing 128 is mounted to the cradle 10. The moveable element 124 for the first 114 and second 116 spring mount assemblies is attached along the first side edge 44 and the moveable element 124 for the third 118 and fourth 120 spring mount assemblies is attached along the second side edge 46.

Referring to FIGS. 3D-3E, alternate views of the third spring mount assembly 118 corresponding to when the back plate 26 is in the front position and the rear position, respectively, are shown. It is understood that the following description of the third spring mount assembly 118 is also applicable to the first 114, second 116 and fourth 120 spring mount assemblies. The stationary housing 128 includes a housing channel 160 located between first 164 and second 166 end members. The moveable element 124 includes a mounting flange 168 for attaching the moveable element 124 to the back plate 26. The moveable element 124 also includes a first spring flange 170 and an elongated section 172. The moveable element 124 is located in the housing channel 160 such that the first spring flange 170 is located adjacent the first end member 164 of the stationary housing 128. The stationary housing 128 also includes a collar 176 having a second spring flange 180 located adjacent the second end member 166. A housing spring 182 is located between the first 170 and second 180 flanges thus encapsulating the housing spring 182 within the stationary housing 128. A housing pin 162 extends through the collar 176 and the moveable element 124 and is affixed between the first 164 and second 166 end members of the stationary housing 128 thus capturing the housing pin 182. The moveable element 124 and housing pin 162 are configured to enable movement of the moveable element 124 relative to the stationary housing 128 and the housing pin 162. In accordance with the invention, a combined spring force of the first 114, second 116, third 118 and fourth 120 spring mount assemblies is selected to be greater than a combined spring force of the plunger springs 62 of the first 14 and second 16 tower assemblies. The first 114, second 116, third 118 and fourth 120 spring mount assemblies enable movement of the back plate 26 from the front back plate position to the rear back plate position in the same direction as the plungers 56 in the first 14 and second 16 tower assemblies.

Figure 6A:
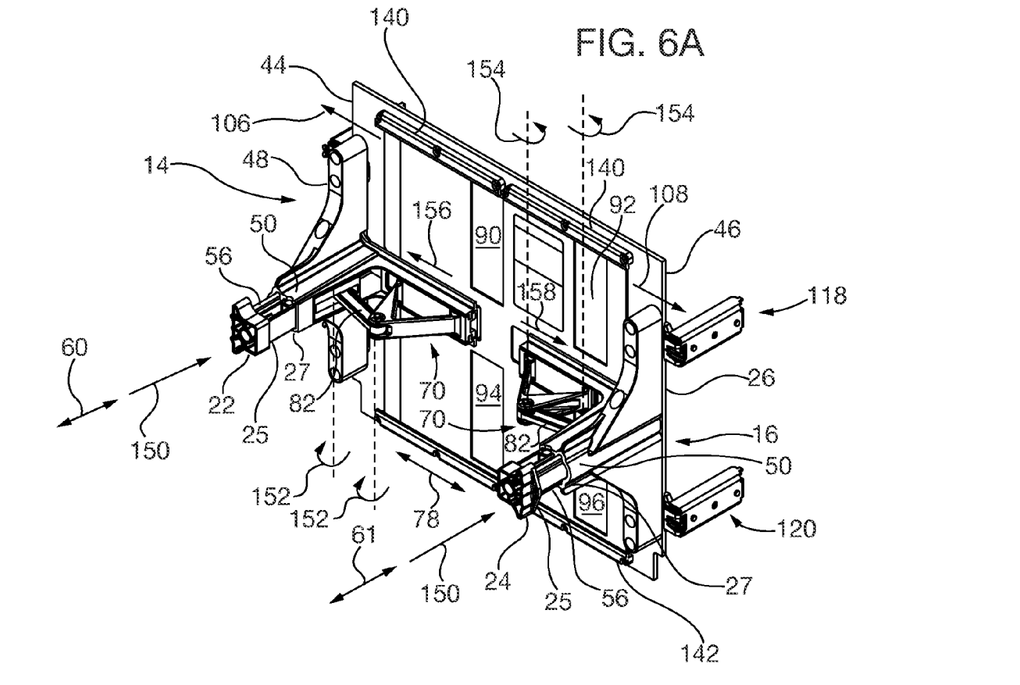
FIGS. 6A-6C depict distinct functional positions for the shutter device.
Figure 6B:
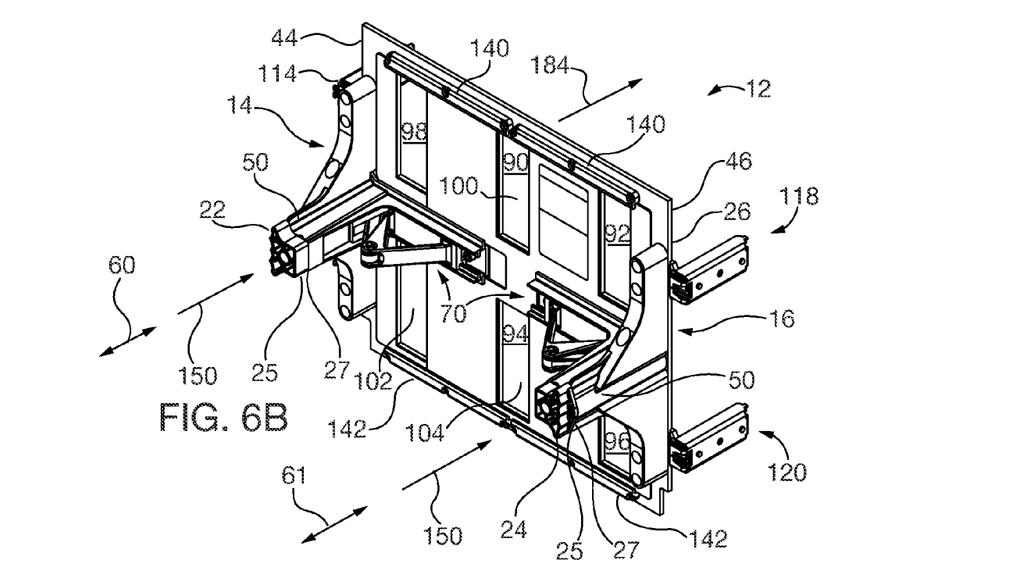
Figure 6C:
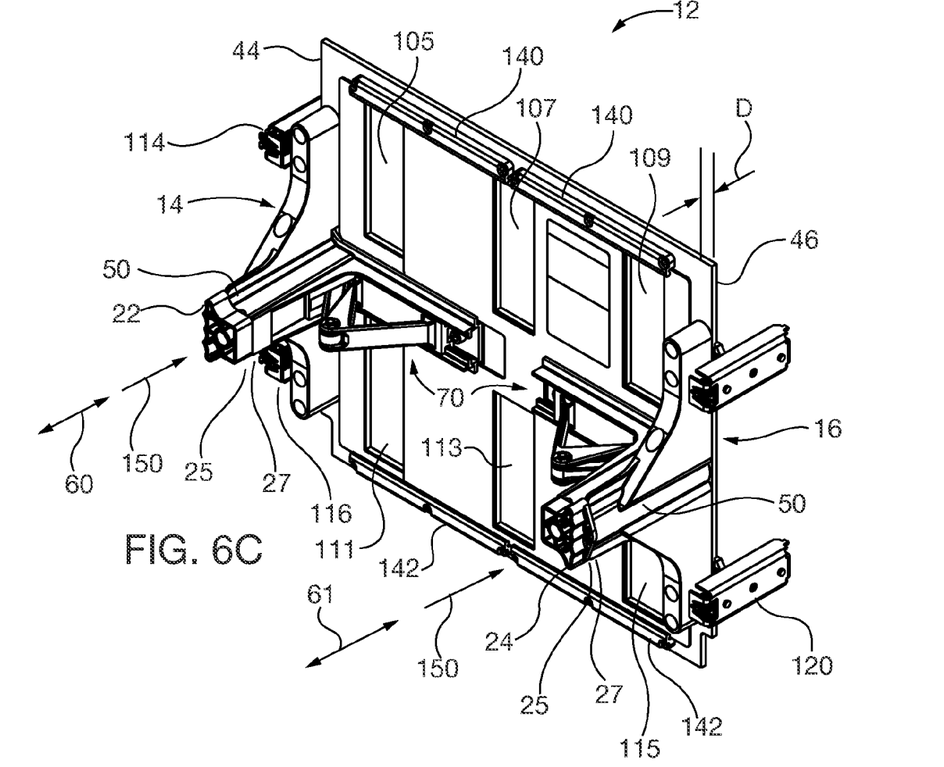
Figure 6D:
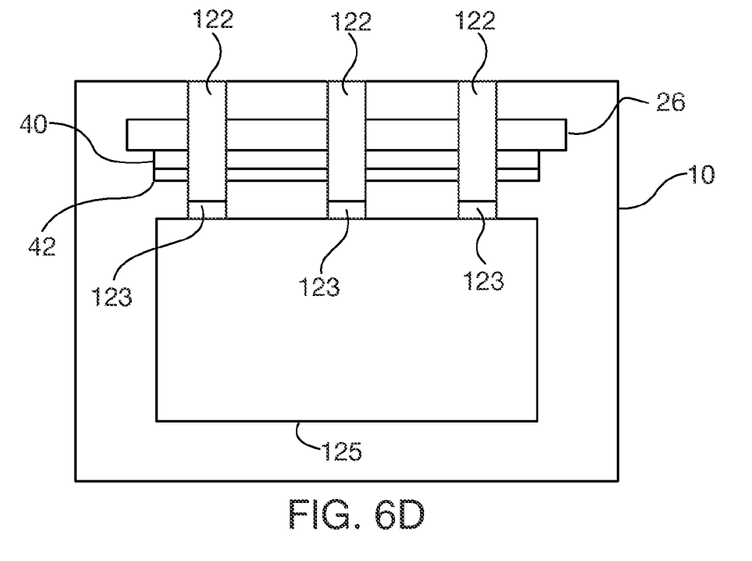
FIG. 6D is a top view schematic representation of the back plate in a rear position wherein terminals of a circuit breaker are connected with terminals of a bus bar.

Referring to FIGS. 6A-6C, operation of the current invention will now be described. The current invention operates in two synchronized stages that include first and second stages of movement. In FIG. 6A, the shutter device 12 is shown in an initial position wherein the first 40 and second 42 masks are in the closed position as described in relation to FIG. 4 and the back plate 26 is shown in the front position. In a first stage of movement, a circuit breaker is inserted into the cradle 10 and simultaneously contacts and pushes the first 22 and second 24 caps (denoted by arrows 150) toward the back plate 26. The plungers 56 of the first 14 and second 16 tower assemblies are then moved along the first 60 and second 61 axes toward the back plate 26 until the rear surface 25 of the first 22 and second 24 caps abuts against an associated contact edge surface 27. The movement toward the back plate 26 compresses the plunger springs 62 and causes clockwise rotation (see arrows 152) of the link arm 82 about the second 88 and first 84 slider pins for the first tower assembly 14 and counterclockwise rotation (see arrows 154) of the link arm 82 about the second 88 and first 84 slider pins for the second tower assembly 16. This causes the slider element 70 of the first tower assembly 14 to move toward the first side edge 44 (see arrow 156) along the third axis 78 thus also moving the first mask 40 in the first direction 106. Further, the slider element 70 of the second tower assembly 16 moves toward the second side edge 46 (see arrow 158) along the third axis 78 thus also moving the second mask 42 in the second direction 108 to place the first 40 and second 42 masks in the open position as shown in FIGS. 6B and 5. FIG. 6B depicts completion of the first stage of movement and the beginning of a second stage of movement for the shutter device 12.

During the first stage, the housing springs 182 of the first 114, second 116, third 118 and fourth 120 spring mount assemblies are not compressed due to their combined higher spring force relative to the combined plunger springs 62 of the first 14 and second 16 tower assemblies. During the second stage of movement, the circuit breaker continues to be pushed against the first 22 and second 24 caps and with continued contact between the rear surface 25 of the first 22 and second 24 caps against an associated contact edge surface 27, the housing springs 182 of the first 114, second 116, third 118 and fourth 120 spring mount assemblies are then compressed thus pushing the back plate 26 rearward (see arrow 184) and synchronizing the first and second stages. This continues until the back plate 26 is moved rearward by a distance D to the rear position as shown in FIG. 6C which depicts completion of the second stage of movement. In accordance with the invention, the back plate 26 is moved rearward a sufficient distance such that bus bar terminals 122, for example, are projected through the first-sixth 105,107,109,111,113,115 mask passageways to enable connection with terminals 123 of a circuit breaker 125 (see FIG. 6D) to place the shutter device 12 in a connected position. Further, upon removal of the circuit breaker 125, the first 40 and second 42 masks return to the closed position and back plate 26 returns to the first back plate position as previously described.

Figure 7:
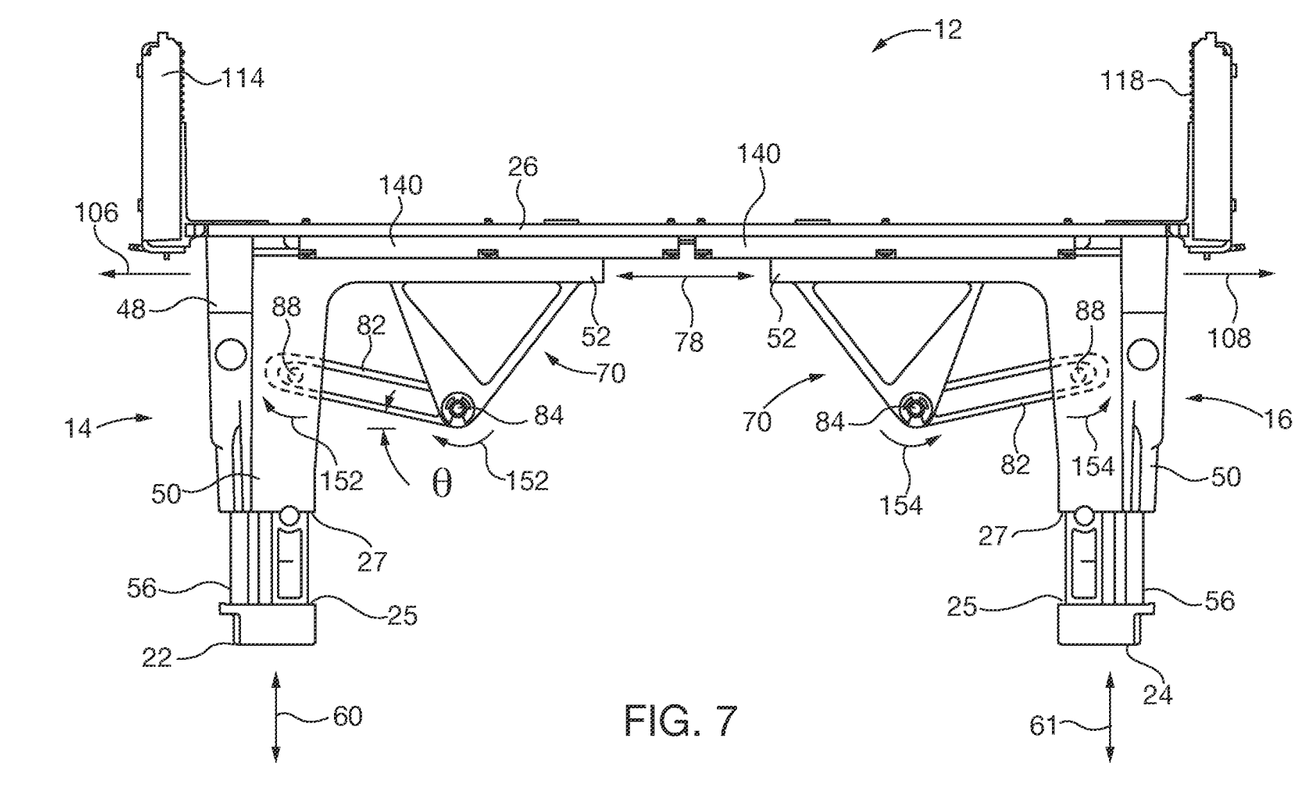
FIG. 7 is a top view of the shutter device and depicts a shallow action angle in accordance with the invention.

Referring to FIG. 7, a top view of the shutter device 12 is shown. In accordance with the invention, the link arms 82 are configured to provide a relatively shallow action angle □ as the first 40 and second 42 masks move to the closed position. This provides a snap-closed feature thus increasing the force moving the first 40 and second 42 masks to the closed position while also minimizing the likelihood that the masks will become stuck in a partially open position. In addition, the current invention substantially increases a depth to width movement ratio (i.e. travel along first 60 and second 61 axes compared to travel along the third axis 78), thus providing smoother movement and reducing static and dynamic forces acting on the first 40 and second 42 masks.

Further, the current invention does not require that there be alignment of the circuit breaker with multiple contact points in order to move the first 40 and second 42 masks thus simplifying operation of the shutter device 12. Previous shutter mechanisms have had up to eight contacts points with the circuit breaker. In addition, forces for moving the first 40 and second 42 masks and back plate 26 are applied through the first 14 and second 16 tower assemblies and the first 114, second 116, third 118 and fourth 120 spring mount assemblies thus avoiding the application of an undesirable bending moment on the back plate 26. Loading of the slider elements 70, link arms 82 and the first 40 and second 42 masks is also substantially reduced thus reducing the likelihood of damage. Additionally, by changing the back plate 26, first 40 and second 42 masks and the first 22 and second 24 caps, the shutter device 12 may be adapted for use with circuit breakers of different widths, depths and frame sizes such as 3 pole, 4 pole, AC and DC circuit breakers.

Figure 8:
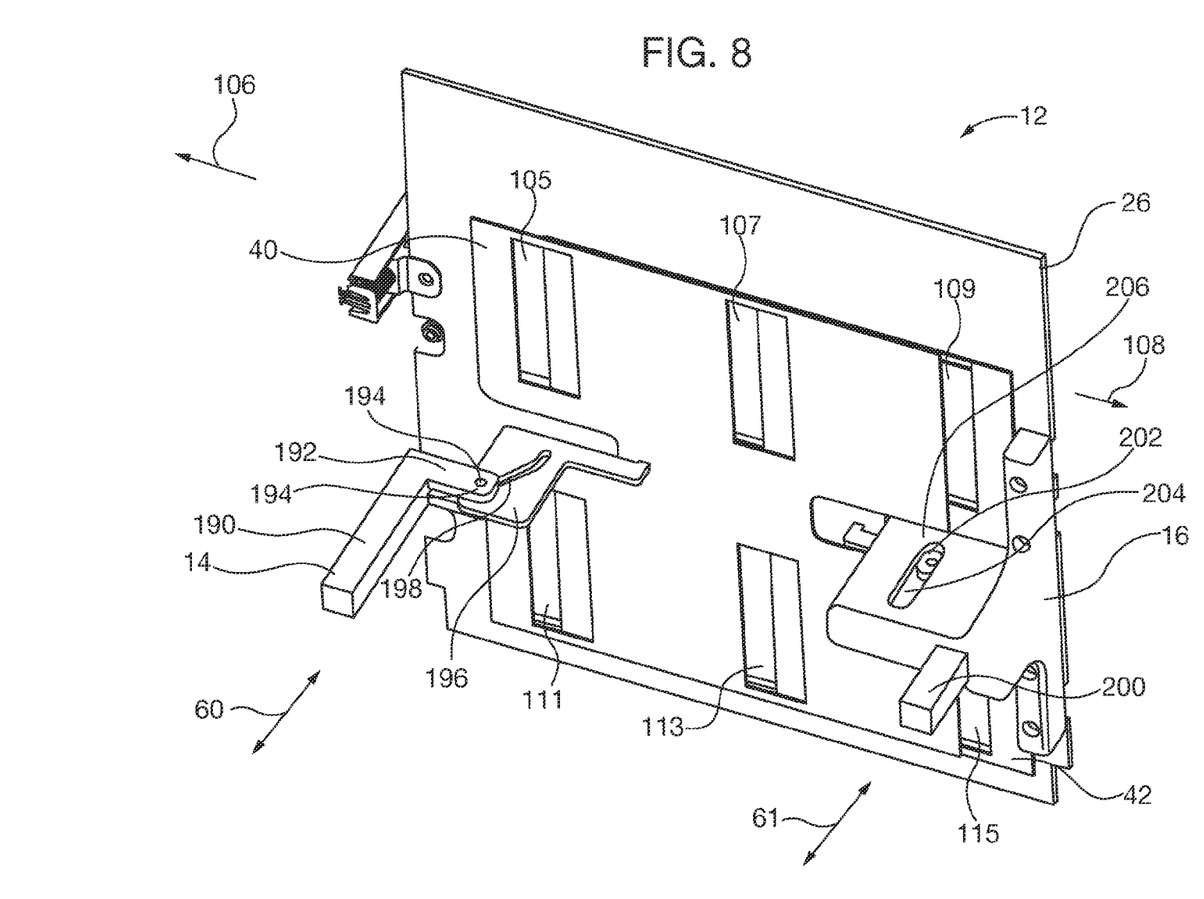
FIG. 8 depicts a view of an alternate embodiment of the present invention.

Referring to FIG. 8, an alternate embodiment of the present invention is shown. In this embodiment, the first tower assembly 14 includes a first plunger 190 having an inverted L-shaped configuration. A leg portion 192 of the first plunger 190 includes a first plunger pin 194. In addition, the first mask 40 includes a first mask bracket 196 having a substantially curved. shaped cam slot 198 which receives the first plunger pin 194. The second tower assembly 16 includes a second plunger 200 having a second plunger pin 202. Further, the second mask 42 includes a second mask bracket 201 an elongated guide slot 204 which receives the second plunger pin 202. The guide slot 204 is oriented substantially parallel to the first 60 and second 61 axes. Upon insertion of a circuit breaker into the cradle 10, the circuit breaker simultaneously contacts ends of the first 190 and second 200 plungers, thus causing the first 190 and second 200 plungers to move toward the back plate 26 along the first 60 and second 61 axes. This causes the first 194 and second 202 plunger pins to move within the cam slot 198 and guide slot 204, respectively. Movement of the first plunger pin 194 in the cam slot 204 causes the first mask 40 to move in the first direction 106. In addition, the second plunger pin 202 guides movement of the back plate 26 as the back plate 26 is moved rearward. Upon contact between the second plunger pin 202 and a rear portion 206 of the guide slot 204, the back plate 26 is located in the rear position as previously described.

Figure 9:
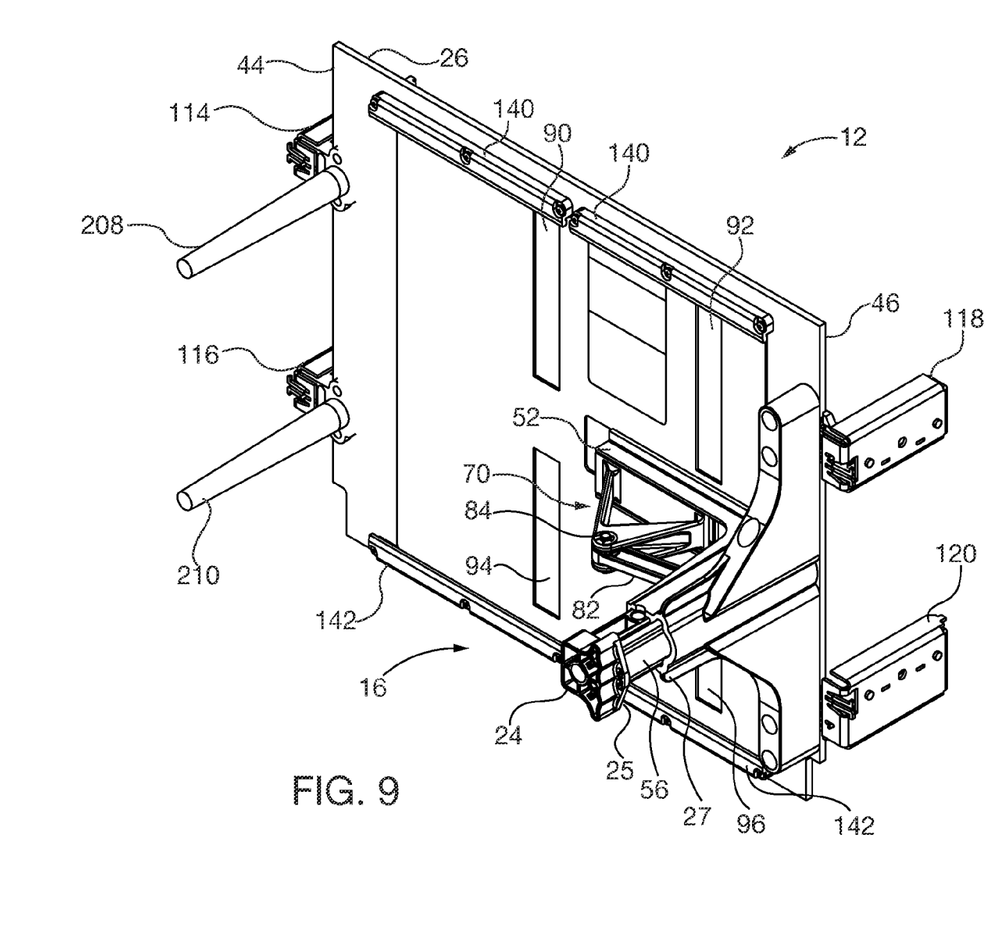
FIG. 9 depicts an additional alternate embodiment of the invention.

Referring to FIG. 9, an additional alternate embodiment of the invention is shown. The shutter device 12 may include only a single tower assembly and thus a single slider element, mask and associated components. By way of example, the shutter device 12 may only include the second tower assembly 16, a single slider element 70, second mask 42 and associated components for enabling operation of the second tower assembly 16 and second mask 42 as previously described. In this embodiment, the first tower assembly 14 is replaced with first 208 and second 210 support elements located along the first side edge 44 which serve to contact a circuit breaker. Other embodiments may include additional support elements or a single support element may be used.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A shutter device for a drawout circuit breaker, comprising:
    first and second moveable plungers for contacting the circuit breaker;
    a first slider element attached to a first mask having a plurality of first apertures wherein the first mask is moveable relative to a back plate;
    a first link arm rotatably attached to the first plunger and the first slider element;
    a second slider element attached to a second mask having a plurality of second apertures wherein the second mask is moveable relative to the back plate;
    a second link arm rotatably attached to the second plunger and the second slider element wherein movement of the first and second plungers in a first direction causes movement of the first and second slider elements and the first and second masks in a second direction transverse to the first direction to form mask passageways; and
    a plurality of spring mount elements for supporting the back plate, wherein the spring mount elements enable movement of the back plate in the first direction.

2. The shutter device according to claim 1, wherein the first and second masks move in opposite directions.

3. The shutter device according to claim 1, wherein the first and second moveable plungers include first and second caps, respectively, for stopping movement of the first and second moveable plungers.

4. The shutter device according to claim 1, wherein the first link arm rotates in a first direction and the second link arm rotates in a direction opposite the first direction.

5. The shutter device according to claim 1, wherein the first and second masks each include a plurality of apertures.

6. The shutter device according to claim 1, wherein the first and second moveable plungers each include a first spring.

7. The shutter device according to claim 6, wherein the spring mount elements each include a second spring and a combined spring force of the second springs is greater than a combined spring force of the first springs.

8. A shutter device for a drawout circuit breaker, comprising:
    first and second guide elements attached to edges of a back plate;
    first and second plungers having first and second caps, respectively, wherein the first and second plungers each include a first spring element and are moveable within the first and second guide elements, respectively, and wherein movement is stopped upon contact between the first and second caps and the first and second guide elements, respectively, and wherein the first and second caps are configured to contact a circuit breaker having a first configuration;
    a first slider element attached to a first mask having a plurality of first apertures;
    a first link arm rotatably attached to the first plunger and the first slider element;
    a second slider element attached to a second mask having a plurality of second apertures;
    a second link arm rotatably attached to the second plunger and the second slider element wherein movement of the first and second plungers in a first direction causes movement of the first slider element and the first mask in a second direction transverse to the first direction and movement of the second slider element and the second mask in a third direction opposite to the second direction to form mask passageways and wherein the first link arm rotates in a first direction and the second link arm rotates in a direction opposite the first direction; and
    a plurality of spring mount elements for supporting the back plate, wherein the spring mount elements enable movement of the hack plate in the first direction upon contact between the first and second caps and the first and second guide elements, respectively.

9. The shutter device according to claim 8, wherein each first spring element is substantially encapsulated by the plunger.

10. The shutter device according to claim 8, wherein the first and second masks each include a plurality of apertures.

11. The shutter device according to claim 8, wherein the first and second caps are interchangeable with other caps configured to accommodate a circuit breaker having a second configuration.

12. The shutter device according to claim 9, wherein the spring mount elements each include second springs and a combined spring force of the second springs is greater than a combined spring force of the first springs.

13. A method for moving a first mask used in a drawout circuit breaker, comprising the steps of:
   moving a first plunger in a first direction;
   moving a first slider element upon movement of the first plunger;
   rotating a first link arm upon movement of the first slider element to cause movement of the first mask in a second direction transverse to the first direction; and
   moving a back plate in the first direction when movement of the first plunger has stopped.

14. The method according to claim 13, wherein the first plunger provides a force to an edge of the back plate.

15. The method according to claim 13, wherein the first plunger includes an interchangeable cap.

16. The method according to claim 13, wherein the first mask includes a plurality of apertures.

17. The method according to claim 13, wherein the first plunger includes a first spring.

18. The method according to claim 17, wherein movement of the back plate is enabled by spring mount elements wherein each spring mount element includes a second spring wherein the second springs have a combined spring force greater than a spring force of the first spring.

19. The method according to claim 18, wherein each first spring is encapsulated.

* * * * *